United States Patent
Liang et al.

(10) Patent No.: US 10,031,744 B2
(45) Date of Patent: Jul. 24, 2018

(54) INCREMENTAL UPGRADE METHOD, APPARATUS FOR APPLYING METHOD AND STORAGE MEDIUM

(71) Applicant: GUANGZHOU UCWEB COMPUTER TECHNOLOGY CO., LTD., Guangzhou (CN)

(72) Inventors: Jie Liang, Guangzhou (CN); Yongfu Yu, Guangzhou (CN); Xiaopeng He, Guangzhou (CN); Shunyan Zhu, Guangzhou (CN); Hao Huang, Guangzhou (CN); Weixin Xu, Guangzhou (CN); Fangzhu Fu, Guangzhou (CN)

(73) Assignee: GUANGZHOU UCWEB COMPUTER TECHNOLOGY CO., LTD, Guangzhou (CN)

( * ) Notice: Subject to any disclaimer, the term of this patent is extended or adjusted under 35 U.S.C. 154(b) by 170 days.

(21) Appl. No.: 14/653,704

(22) PCT Filed: Aug. 28, 2013

(86) PCT No.: PCT/CN2013/082456
§ 371 (c)(1),
(2) Date: Jun. 18, 2015

(87) PCT Pub. No.: WO2014/101451
PCT Pub. Date: Jul. 3, 2014

(65) Prior Publication Data
US 2016/0004530 A1    Jan. 7, 2016

(30) Foreign Application Priority Data

Dec. 27, 2012  (CN) .......................... 2012 1 0580670

(51) Int. Cl.
*G06F 9/44*    (2018.01)
*G06F 8/658*   (2018.01)
(Continued)

(52) U.S. Cl.
CPC ................ *G06F 8/658* (2018.02); *G06F 8/68* (2013.01); *G06F 17/30203* (2013.01); *H04L 67/34* (2013.01); *H04L 69/04* (2013.01)

(58) Field of Classification Search
CPC . G06F 8/68; G06F 8/71; G06F 9/5066; G06F 17/30067; Y10S 707/99931; Y10S 707/99942; Y10S 707/99953
(Continued)

(56) References Cited

U.S. PATENT DOCUMENTS

2003/0212712 A1\* 11/2003 Gu .................... G06F 17/30067
2008/0216066 A1\*  9/2008 Oh .......................... G06F 8/658
                                                              717/173
(Continued)

FOREIGN PATENT DOCUMENTS

CN     1409239 A    4/2003
CN    102081536     6/2011
(Continued)

OTHER PUBLICATIONS

PCT International Search Report dated Dec. 5, 2014, issued in corresponding International Application No. PCT/CN2013/082456 (5 pages).
(Continued)

*Primary Examiner* — Wei Zhen
*Assistant Examiner* — Mohammed Huda

(57) ABSTRACT

The present invention provides an incremental upgrade method, an apparatus applying the method and a storage medium. The incremental upgrade method comprises: sending a request to a server for downloading an incremental upgrade package corresponding to a local old version file on a terminal; receiving the incremental upgrade package, which comprises unmatched block data obtained by comparing a first compressed file with a second compressed file,
(Continued)

and the start and end information of the unmatched block data, wherein the first compressed file is a compressed file that concatenates an old version file and a new version file on the server, and the second compressed file is a compressed file of the old version file on the server; concatenating the unmatched block data in the incremental upgrade package and a local second compressed file generated from the local old version file on the terminal to generate a concatenate compressed file; and at last decompressing the concatenate compressed file to obtain the new version file. The method reduces data traffic and occupied bandwidth resources.

7 Claims, 6 Drawing Sheets

(51) Int. Cl.
    *H04L 29/08*     (2006.01)
    *H04L 29/06*     (2006.01)
    *G06F 17/30*     (2006.01)

(58) Field of Classification Search
    USPC ........................................................ 717/169
    See application file for complete search history.

(56) References Cited

U.S. PATENT DOCUMENTS

2009/0129293 A1    5/2009  Hartog et al.
2011/0119240 A1*  5/2011  Shapira ............. G06F 17/30067
                                            707/693

FOREIGN PATENT DOCUMENTS

CN          102799448 A    11/2012
CN          103051723 A    4/2013
WO         2014101451     7/2014

OTHER PUBLICATIONS

International Preliminary Report for PCT App. No. PCT/CN2013/082456, dated Jun. 30, 2015, 1 page.
Office Action for CN App. No. 2012105806706, dated Apr. 12, 2016, 4 pages.
Office Action for CN App. No. 2012105806706, dated Sep. 14, 2015, 26 pages.
Office Action for CN App. No. 2012105806706, dated Dec. 22, 2014, 26 pages.
Written Opinion for PCT App. No. PCT/CN2013/082456, dated Dec. 5, 2013, 15 pages.

* cited by examiner

INCREMENTAL UPGRADE METHOD, APPARATUS FOR APPLYING METHOD AND STORAGE MEDIUM

CROSS-REFERENCE TO RELATED APPLICATION

The present application is a national stage application of International Application No. PCT/CN2013/082456, filed on Aug. 28, 2013, which claims the benefit of Chinese Patent Application No. 201210580670.6, filed on Dec. 27, 2012. The content of both of the above-referenced applications is herein incorporated by reference in their entirety.

TECHNICAL FIELD

The present invention relates to the field of data transmission processing technologies, and in particular, to an incremental upgrade method, an apparatus applying the method and a storage medium.

BACKGROUND

Version upgrade refers to an update for removing bugs in an operating system or an old version of software, or adding a new application function to software, to make software more perfect and useful.

When a terminal performs version upgrade on a local old version file, the terminal needs to acquire data information of a new version from a server. Assuming that an installation package file of a local old version on the terminal is old.apk having a size of 5M, and an installation package file of a new version that needs to be acquired is new.apk having a size of 6M, in a conventional version upgrade technology, the new.apk having the size of 6M needs to be downloaded to complete the version upgrade.

However, this conventional version upgrade method needs to download a complete new version of installation package file from the server, the size of downloaded data is large, and an excessive bandwidth resource may be occupied.

Therefore, a downloading and upgrade technology for reducing data transmission size during version upgrade is needed, to reduce occupied bandwidth resources.

SUMMARY

In view of the above problem, an objective of the present invention is to provide an incremental upgrade method, an apparatus applying the method and a corresponding storage medium, to reduce the size of data downloaded by a terminal from a server during version upgrade of a terminal file, and reduce a bandwidth resource that is occupied.

According to one aspect of the present invention, an incremental upgrade method at a terminal side is provided, which includes:

sending a request to a server for downloading an incremental upgrade package corresponding to a local old version file on a terminal;

downloading an incremental upgrade package from the server according to the request for downloading the incremental upgrade package corresponding to the old version file, where the incremental upgrade package includes unmatched block data obtained by comparing a first compressed file with a second compressed file, and the start and end information of the unmatched block data, wherein the second compressed file is a compressed file of the old version file, and the first compressed file is a compressed file that concatenates the old version file and a new version file;

concatenating the unmatched block data and a local second compressed file (compressed from the local old version file) according to the start and end information of the unmatched block data in the incremental upgrade package, to generate a concatenate compressed file; and decompressing the concatenate compressed file to obtain the new version file.

According to another aspect of the present invention, an incremental upgrade method at a server side is further provided, which includes:

concatenating an old version file and a new version file and then compressing the concatenate file to obtain a first compressed file, and compressing the old version file to obtain a second compressed file;

comparing the first compressed file with the second compressed file to obtain unmatched block data and the start and end information of the unmatched block data;

generating an incremental upgrade package according to the unmatched block data and the start and end information of the unmatched block data;

receiving a request sent by a terminal for downloading an incremental upgrade package corresponding to a local old version file on the terminal;

sending the incremental upgrade package to the terminal, such that the terminal can concatenate the unmatched block data and a local second compressed file (compressed from the local old version file) according to the start and end information of the unmatched block data in the incremental upgrade package to generate a concatenate compressed file, and decompress the concatenate compressed file to obtain the new version file.

According to yet another aspect of the present invention, an incremental upgrade method at a server side is further provided, which includes:

receiving a request sent by a terminal for downloading an incremental upgrade package corresponding to a local old version file on the terminal, the request including version information of the old version file corresponding to the incremental upgrade package;

searching for a local old version file and a new version file on the server according to the version information of the old version file in the request;

concatenating the old version file and the new version file on the server and then compressing the concatenate file to obtain a first compressed file, and compressing the old version file to obtain a second compressed file;

comparing the first compressed file with the second compressed file to obtain unmatched block data and the start and end information of the unmatched block data;

generating, by the server, the incremental upgrade package according to the unmatched block data and the start and end information of the unmatched block data; and sending the incremental upgrade package to the terminal, such that the terminal can concatenate the unmatched block data and a local second compressed file (compressed from the terminal-side local old version file) according to the start and end information of the unmatched block data in the incremental upgrade package to generate a concatenate compressed file, and decompress the concatenate compressed file to obtain the new version file.

According to yet another aspect of the present invention, a terminal is further provided, which includes:

an upgrade package requesting unit, configured to send a request to a server for downloading an incremental upgrade package corresponding to a local old version file on the terminal;

an upgrade package receiving unit, configured to receive the incremental upgrade package, where the incremental upgrade package includes unmatched block data obtained by comparing a first compressed file with a second compressed file, and the start and end information of the unmatched block data, wherein the second compressed file is a compressed file of the old version file, and the first compressed file is a compressed file that concatenates the old version file and a new version file;

a data combining unit, configured to concatenate the unmatched block data and a local second compressed file (compressed from the local old version file) according to the start and end information of the unmatched block data in the incremental upgrade package, to generate a concatenate compressed file; and a decompressing unit, configured to decompress the concatenate compressed file to obtain the new version file.

According to yet another aspect of the present invention, a server is further provided, which includes:

a compressing unit, configured to concatenate an old version file and a new version file and then compress the concatenate file to obtain a first compressed file, and compress the old version file to obtain a second compressed file;

a comparing unit, configured to compare the first compressed file with the second compressed file to obtain unmatched block data and the start and end information of the unmatched block data;

an upgrade package generating unit, configured to generate an incremental upgrade package according to the unmatched block data and the start and end information of the unmatched block data;

a first request receiving unit, configured to receive a request sent by a terminal for downloading the incremental upgrade package corresponding to a local old version file on the terminal;

an upgrade package sending unit, configured to send the incremental upgrade package to the terminal, such that the terminal can concatenate the unmatched block data and a local second compressed file (compressed from the local old version file) according to the start and end information of the unmatched block data in the incremental upgrade package to generate a concatenate compressed file, and decompress the concatenate compressed file to obtain the new version file.

According to yet another aspect of the present invention, a server is further provided, which includes:

a request receiving unit, configured to receive a request sent by a terminal for downloading an incremental upgrade package corresponding to a local old version file on the terminal, the request including version information of the old version file corresponding to the incremental upgrade package;

a searching unit, configured to search for a local old version file and a new version file on the server according to the version information of the old version file in the request;

a compressing unit, configured to concatenate the old version file and the new version file and then compress the concatenate file to obtain a first compressed file, and compress the old version file to obtain a second compressed file;

a comparing unit, configured to compare the first compressed file with the second compressed file to obtain unmatched block data and the start and end information of the unmatched block data;

an upgrade package generating unit, configured to generate the incremental upgrade package according to the unmatched block data and the start and end information of the unmatched block data; and an upgrade package sending unit, configured to send the incremental upgrade package to the terminal, such that the terminal can concatenate the unmatched block data and a local second compressed file (compressed from the local old version file) according to the start and end information of the unmatched block data in the incremental upgrade package to generate a concatenate compressed file, and decompress the concatenate compressed file to obtain the new version file.

In addition, the present invention further provides a computer readable storage medium having a processor-executable program code, when being executed, the program code enabling the processor to execute the following steps:

sending a request to a server for downloading an incremental upgrade package corresponding to a local old version file on a terminal;

downloading an incremental upgrade package from the server according to the request for downloading the incremental upgrade package corresponding to the old version file, where the incremental upgrade package includes unmatched block data obtained by comparing a first compressed file with a second compressed file, and the start and end information of the unmatched block data, wherein the second compressed file is a compressed file of the old version file, and the first compressed file is a compressed file that concatenates the old version file and a new version file;

concatenating the unmatched block data and a local second compressed file (compressed from the local old version file) according to the start and end information of the unmatched block data in the incremental upgrade package, to generate a concatenate compressed file; and decompressing the concatenate compressed file to obtain the new version file.

The present invention further provides another computer readable storage medium having a processor-executable program code, when being executed, the program code enabling the processor to execute the following steps:

concatenating an old version file and a new version file and then compressing the concatenate file to obtain a first compressed file, and compressing the old version file to obtain a second compressed file;

comparing the first compressed file with the second compressed file to obtain unmatched block data and the start and end information of the unmatched block data;

generating an incremental upgrade package according to the unmatched block data and the start and end information of the unmatched block data;

receiving a request sent by a terminal for downloading the incremental upgrade package corresponding to a local old version file on the terminal;

sending the incremental upgrade package to the terminal, such that the terminal can concatenate the unmatched block data and a local second compressed file (compressed from the local old version file) according to the start and end information of the unmatched block data in the incremental upgrade package to generate a concatenate compressed file, and decompress the concatenate compressed file to obtain the new version file.

By means of the incremental upgrade method and the apparatus applying the method according to the present invention, a terminal obtains an incremental upgrade package at a server side, and obtains a new version file according to the incremental upgrade package, thereby implementing incremental upgrade; moreover, the incremental upgrade package merely includes unmatched block data information between a compressed file that concatenates a new version file and an old version file and a compressed file of the old version file, which has a greatly reduced data size compared with the complete new version file data, and therefore, the size of data that needs to be downloaded by the terminal from the server is obviously less than the conventional method. The method saves data traffic, reduces occupied bandwidth resources, greatly accelerates the version upgrade process, improves the efficiency of version upgrade, and saves storage medium resources of the server.

In order to implement the above and relevant objectives, one or more aspects of the present invention include features that will be described in detail later and specifically pointed out in claims. The following descriptions and accompanying drawings describe some exemplary aspects of the present invention in detail. However, those aspects merely indicate some implementations among various ones utilizing the principle of the present invention. Moreover, the present invention is intended to include all the aspects and equivalents thereof.

BRIEF DESCRIPTION OF THE DRAWINGS

With reference to the descriptions in combination with the accompanying drawings and content in the claims, and along with more thorough understanding of the present invention, other objectives and results of the present invention will be more comprehensible and easily understandable. In the drawings:

In all the accompanying drawings, identical reference numerals indicate similar or corresponding features or functions.

DETAILED DESCRIPTION

In order to make a person skilled in the art better understand technical solutions in the embodiments of the present invention, and make the above objectives, features and advantages of the embodiments of the present invention more comprehensible, the technical solutions in the embodiments of the present invention are described in further details with reference to the accompanying drawings.

In the following descriptions, many specific details are described to provide thorough understanding on one or more embodiment for the sake of illustration. However, apparently, the embodiments may also be implemented without the specific details. In other examples, well-known structures and devices are shown as block diagrams to describe one or more embodiments.

Figure 1:
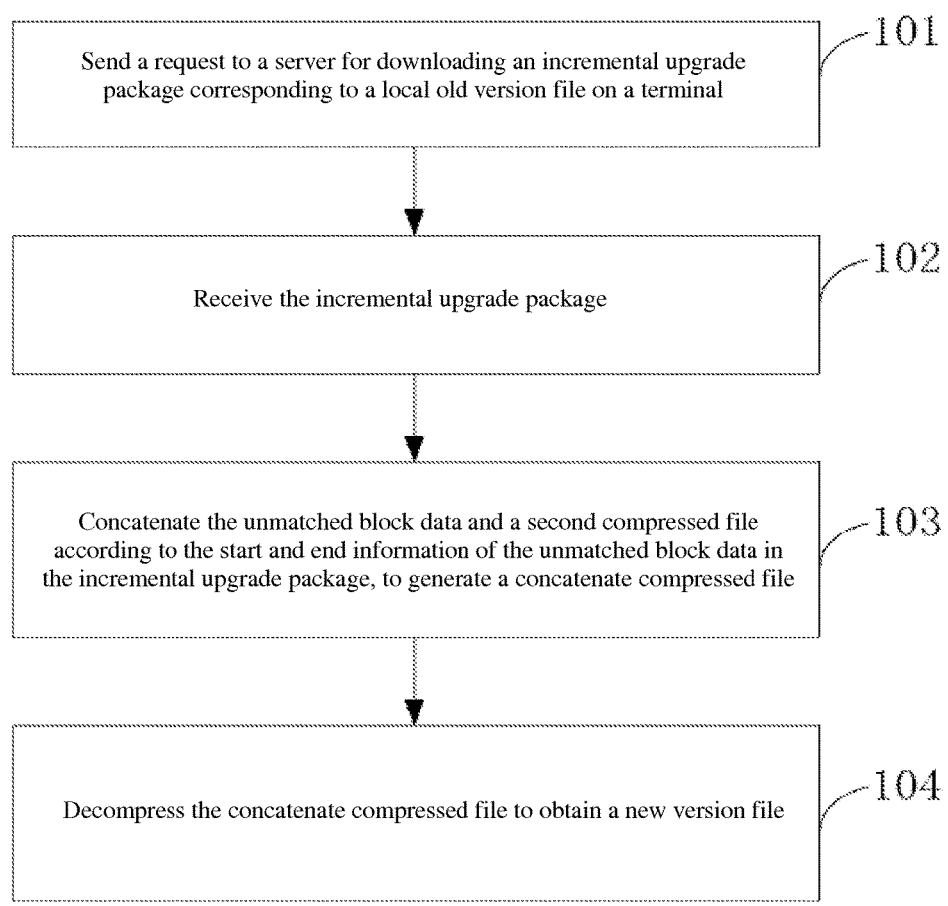
FIG. 1 is a flow chart of an incremental upgrade method according to an embodiment of the present invention.

FIG. 1 shows a process of an incremental upgrade method according to an embodiment of the present invention.

As shown in FIG. 1, from the perspective of a terminal side receiving an incremental upgrade package, the incremental upgrade method provided in one embodiment of the present invention includes the following steps:

Step 101: A terminal sends a request to a server for downloading an incremental upgrade package corresponding to a local old version file on the terminal.

In this embodiment, after acquiring relevant information of the incremental upgrade package on the server, the terminal may send a request to the server for downloading the incremental upgrade package corresponding to the local old version file on the terminal. The terminal may also send a download request to the server without knowing whether there is an incremental upgrade package on the server. The request includes identification information or association information of the incremental upgrade package needed by the terminal, such as old version file information corresponding to the incremental upgrade package stored on the terminal, so that the server accordingly acquires the incremental upgrade package that needs to be downloaded.

Step 102: The terminal receives the incremental upgrade package from the server.

The incremental upgrade package includes unmatched block data obtained by comparing a first compressed file and a second compressed file and the start and end information of the unmatched block data, where the second compressed file is a compressed file of the old version file, and the first compressed file is a compressed file that concatenates the old version file and a new version file. By means of the unmatched block data and the start and end information thereof, the terminal can concatenate a new upgrade version on the basis of the compressed file of the original old version.

After receiving the download request, the server may search, according to information in the request, to see whether the server locally has the incremental upgrade package, and if yes, directly sends it to the terminal; if no, generates the incremental upgrade package and then sends it to the terminal.

Specifically, an exemplary process of the server generating the incremental upgrade package may be that: the server concatenates the old version file and the new version file and then compresses the concatenate file to obtain a first compressed file, and compresses the old version file to obtain a second compressed file, then compares the first compressed file with the second compressed file to obtain unmatched block data and the start and end information of the unmatched block data, and finally generates the incremental upgrade package according to the unmatched block data and the start and end information of the unmatched block data. The unmatched block data is the difference between the old version and the corresponding new version.

There may be several manners for the server to obtain the old version file and the corresponding new version file, such as acquiring locally, or downloading and acquiring online, etc.

Step 103: The terminal concatenates the unmatched block data and the local second compressed file (compressed from the local old version file) according to the start and end information of the unmatched block data in the incremental upgrade package, to generate a concatenate compressed file.

After acquiring the incremental upgrade package, the terminal obtains the new version file by using a reverse process of the server generating the incremental upgrade package. Specifically, in this step, the terminal first concatenates, according to the start and end information of the unmatched block data, the unmatched block data and the compressed file of the local old version file on the terminal, i.e., the local second compressed file of the terminal, to obtain the concatenate compressed file, and the concatenate compressed file is actually the first compressed file obtained at the server side.

Because it is a file upgrading procedure, the old version file that needs to be upgraded is in the terminal, and generally, the compressed file of the old version file (that is, the second compressed file) can also be stored on the terminal locally. Therefore, the unmatched block data in the incremental upgrade package may be directly concatenated with the local second compressed file to obtain the concatenate compressed file (that is, the first compressed file, i.e., the compressed file including the new version file to be used for upgrading). If the terminal does not have the second compressed file locally, the terminal may also obtain the second compressed file according to the local old version file on the terminal by using a known data processing manner. This data processing manner is in the prior art and is not the focus of the technical processing of the present invention, and therefore, it is not elaborated herein.

Step 104: The terminal decompresses the concatenate compressed file to obtain the new version file.

After the terminal decompresses the concatenate compressed file, the terminal may obtain the new version file corresponding to the old version file to be upgraded.

From the perspective of upgrading data transmission, the terminal is capable of implementing the incremental upgrade at the terminal side upon obtaining the new version file corresponding to the old version file to be upgraded. Then, the terminal may upgrade the original old version file according to the new version file.

The upgrade process of this step is similar to the prior art, and is not elaborated herein.

In the embodiment shown in FIG. 1, the terminal obtains an incremental upgrade package from a server side, and obtains a new version file according to the incremental upgrade package, thereby implementing incremental upgrade; moreover, the incremental upgrade package merely includes unmatched block data information between a compressed file that concatenates a new version file and an old version file and a compressed file of the old version file, which has a greatly reduced data size compared with the complete new version file data, and therefore, the size of data that needs to be downloaded by the terminal from the server is obviously less than the conventional method. The method reduces data traffic, reduces occupied bandwidth resources, greatly accelerates the version upgrade, improves the efficiency of version upgrade, and saves storage medium resources of the server.

Figure 2A:
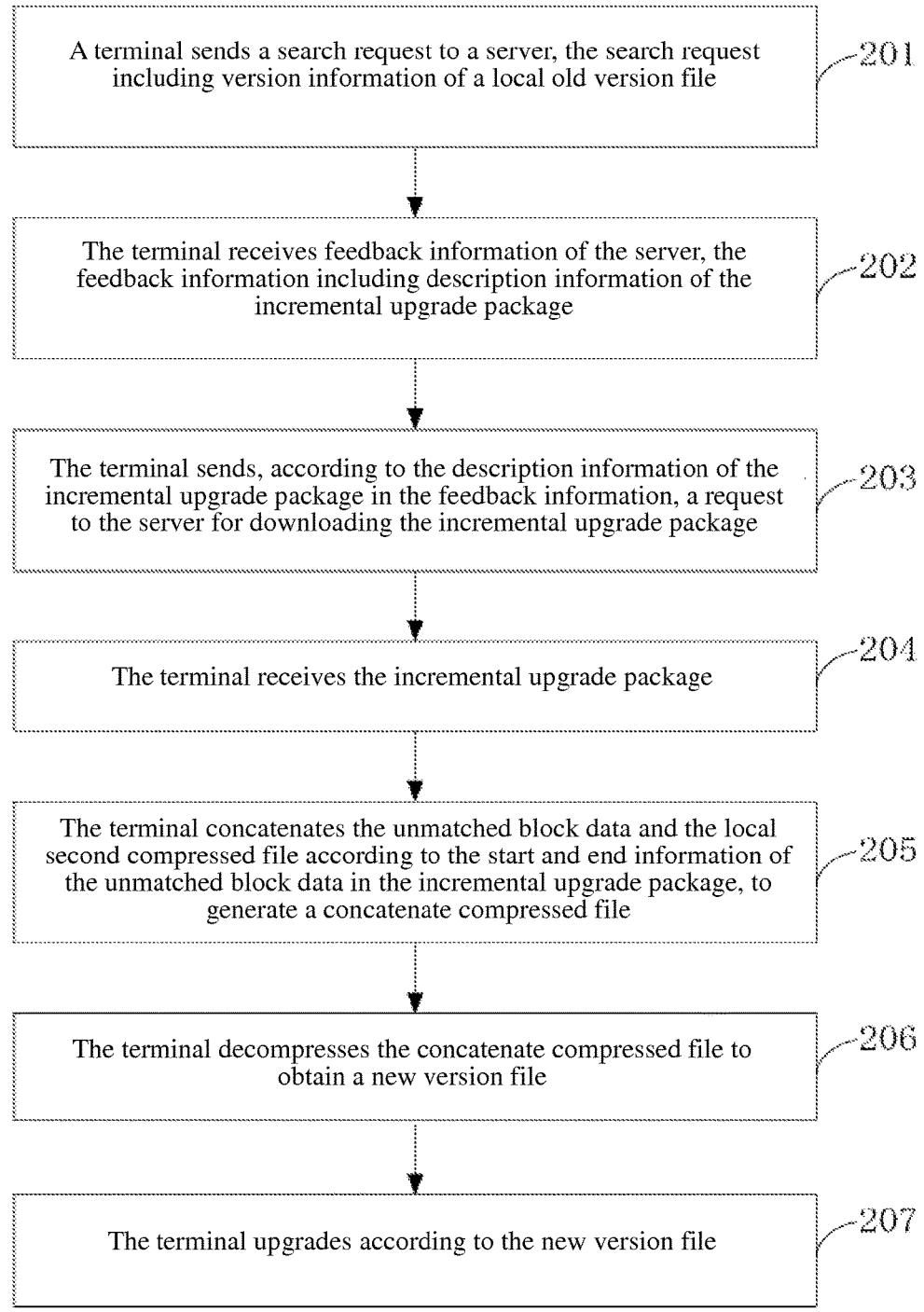
FIG. 2*a* is a flow chart of an incremental upgrade method according to another embodiment of the present invention.

FIG. 2a shows a flow of an incremental upgrade method according to another embodiment of the present invention, and the process also performs incremental upgrade data processing from the perspective of the terminal side.

As shown in FIG. 2a, the incremental upgrade method in this embodiment includes the following steps:

Step 201: A terminal sends a search request to a server, the search request including version information of an old version file that needs to be upgraded.

The terminal may send a request of searching for an incremental upgrade package to the server periodically or at a preset time, and the search request may include version information of the old version file, for example, V1.1.0, to facilitate the server searching for a corresponding upgrade package and the like.

After receiving the search request, the server searches for the incremental upgrade package according to the search request. If at this time the server has generated the incremental upgrade package between the new version file and the old version file, description information of the incremental upgrade package may be extracted; and if no incremental upgrade package is generated, the server generates an incremental upgrade package temporarily after finding the new version file and the old version file locally. No matter whether the incremental upgrade package is generated in advance or not, the generation process may use the method of the server generating the incremental upgrade package in step 102 in the embodiment shown in FIG. 1.

Figure 2B:
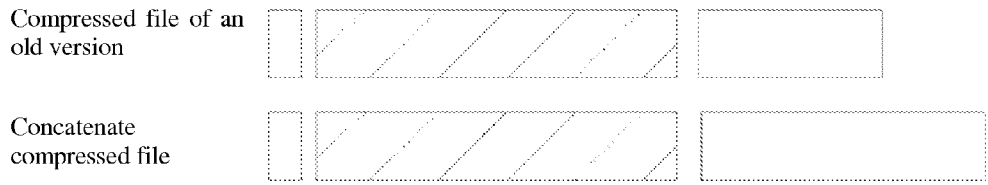
FIG. 2*b* is a schematic view of generating an incremental upgrade package according to an embodiment of the present invention.

FIG. 2b shows an example of generation of an incremental upgrade package according to an embodiment of the present invention. Assuming that the terminal side has an old version file old.apk that has the size of 5M and needs to be upgraded to a new version file, and the server side has the old version file old.apk and a new version file new.apk that has the size of 6M.

When the server generates the incremental upgrade package, the server first compresses old.apk to obtain old.7z (a compressed file of an old version) that has the size of 2M; concatenates old.apk and new.apk, then compresses the concatenate file to obtain old_new.7z (a concatenate compressed file) that has the size of 2.2M, and compares old.7z with old_new.7z, as shown in FIG. 2b, to obtain unmatched block data and the start and end information of the unmatched block. In FIG. 2b, the dashed area indicates the same data, and blank area indicates different data in two compressed files of old.7z and old_new.7z. That is, the unmatched block data, and the start and end information of the unmatched block data may also be obtained through comparison, and the incremental upgrade package generated at the server side includes the unmatched block data and the start and end information thereof and has the size of about 1M; therefore, the terminal merely needs to download the incremental upgrade package having the size of 1M, and the download size is greatly reduced.

The server feeds back the description information of the incremental upgrade package to the terminal, and can also feedback version information of the new version file or the like, where the description information of the incremental upgrade package may specifically be identification information such as a name of the incremental upgrade package.

Step 202: The terminal receives the feedback information of the server, the feedback information including the description information of the incremental upgrade package.

Step 203: The terminal sends, according to the description information of the incremental upgrade package in the feedback information, a request to the server for downloading the incremental upgrade package.

Step 204: The terminal receives the incremental upgrade package.

Step 205: The terminal concatenates the unmatched block data and the local second compressed file according to the start and end information of the unmatched block data in the incremental upgrade package, to generate a concatenate compressed file.

Assuming that after the terminal receives the unmatched block data of the two compressed files of old.7z and old_new.7z and the start and end information thereof, the terminal concatenates the unmatched block data and the local old.7z according to the start and end information of the unmatched block data, where the concatenation process is restoring the old_new.7z as shown in FIG. 2b.

Step 206: The terminal decompresses the concatenate compressed file to obtain the new version file.

The terminal decompresses the old_new.7z obtained through concatenation in the previous step, to obtain the new version file new.apk corresponding to the old version file old.apk.

Step 207: The terminal upgrades the original old version file old.apk according to the new version file new.apk.

The steps 204 to 207 are similar to the steps 102 to 105 in the previous embodiment, and are not repeated herein.

In the embodiment shown in FIG. 2a, the terminal obtains an incremental upgrade package at a server side, and obtains a new version file according to the incremental upgrade package, thereby implementing incremental upgrade; moreover, the incremental upgrade package merely includes unmatched block data information between a compressed file that concatenates a new version file and an old version file and a compressed file of the old version file, which has a greatly reduced data size compared with the complete new version file data, and therefore, the size of data that needs to be downloaded by the terminal from the server is obviously less than the conventional method. The method reduces data traffic, reduces occupied bandwidth resources, greatly accelerates the version upgrade, improves the efficiency of version upgrade, and saves storage medium resources of the server.

Figure 3:
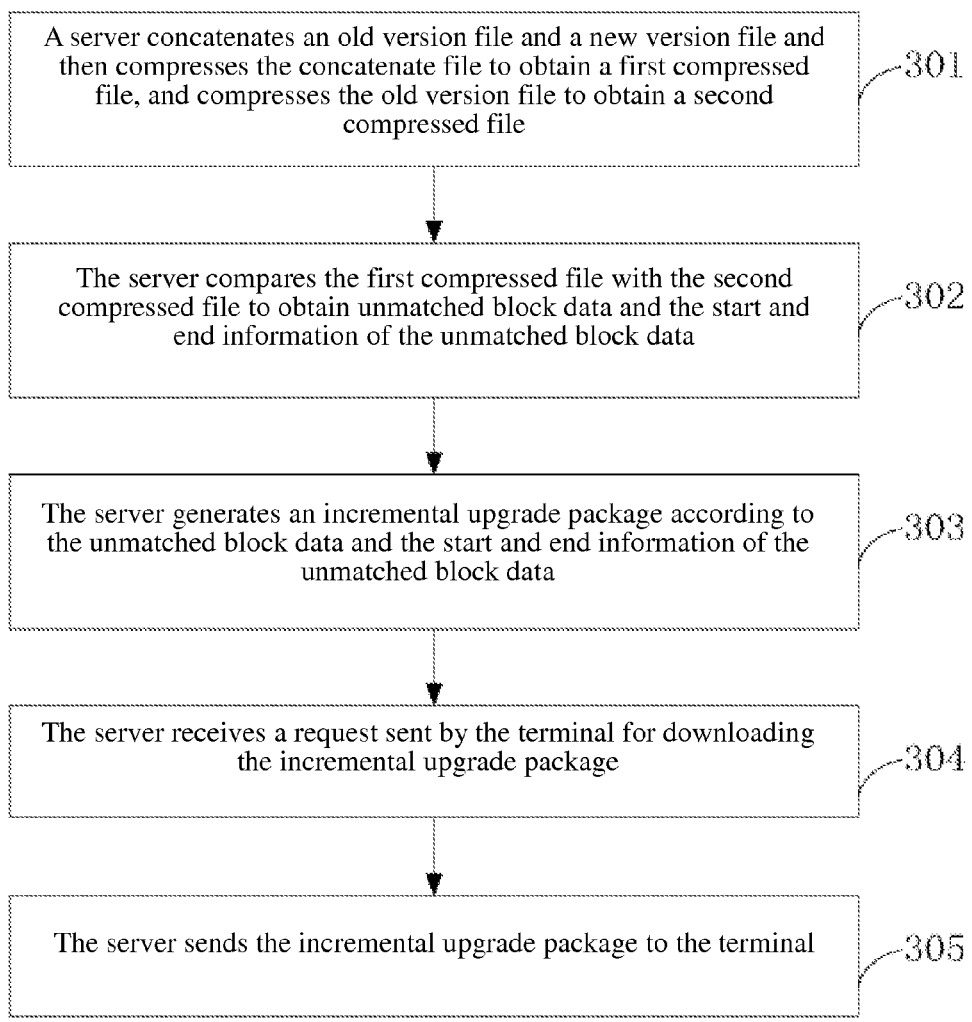
FIG. 3 is a flow chart of an incremental upgrade method according to yet another embodiment of the present invention.

FIG. 3 shows a process of an incremental upgrade method according to yet another embodiment of the present invention.

As shown in FIG. 3, from the perspective of a server side sending an incremental upgrade package, the incremental upgrade method provided by the present invention includes:

Step 301: A server compresses an old version file to obtain a second compressed file, and concatenates the old version file and a new version file and then compresses the concatenate file to obtain a first compressed file.

In this embodiment, no matter whether the server receives a search request or a request for downloading an incremental upgrade package sent by the terminal, an incremental upgrade package may be generated first by using steps 301 to 303.

In this step, the server first concatenates the local old version file and the new version file, the concatenation being connecting data of the old version file and data of the new version file with the old version prior to the new version, and then compresses the concatenate file to obtain a first compressed file; the server compressed the old version file separately to obtain a second compressed file. The process of obtaining the first compressed file and the process of obtaining the second compressed file may be performed simultaneously, or may be performed according to a certain order.

Step 302: The server compares the first compressed file with the second compressed file to obtain unmatched block data and the start and end information of the unmatched block data.

The server compares the first compressed file and the second compressed file, determines the data content difference between the two files as the unmatched block data, and records the start and end points information of the data content difference.

Step 303: The server generates an incremental upgrade package according to the unmatched block data and the start and end information of the unmatched block data.

Step 304: The server receives a request sent by the terminal for downloading the incremental upgrade package.

Step 305: The server sends the incremental upgrade package to the terminal.

The terminal concatenates the unmatched block data and the local second compressed file, i.e., the compressed file of the old version file according to the start and end information of the unmatched block data in the incremental upgrade package, to generate the concatenate compressed file, decompresses the concatenate compressed file to obtain the new version file, and upgrades the old version file according to the new version file.

In the embodiment of the present invention, the server generates an incremental upgrade package according to the unmatched block data information between the compressed file that concatenates the old version file and the new version file and the compressed file of the old version file, so that the terminal obtains the new version file according to the incremental upgrade package, thereby implementing incremental upgrade. The incremental upgrade package has a greatly reduced data size compared with the complete new version file data, and therefore, the size of data that needs to be downloaded by the terminal from the server is obviously less than the conventional method. The method reduces data traffic, reduces occupied bandwidth resources, greatly accelerates the version upgrade, improves the efficiency of version upgrade, and saves storage medium resources of the server.

In another embodiment, before the old version file and the new version file are concatenated and then the concatenate file is compressed to obtain the first compressed file at the server side, and the old version file is compressed to obtain the second compressed file at the server side, the method may further include:

the server receives a search request sent by the terminal, the search request including version information of the old version file;

the server searches for the old version file and the new version file according to the version information of the old version file in the search request;

the server concatenates the old version file and the new version file and then compresses the concatenate file to obtain the first compressed file, and compresses the old version file to obtain the second compressed file. The concatenating and compressing steps may include:

concatenating, by the server, the old version file and the new version file found locally and compressing the concatenate file to obtain the first compressed file, and compressing the old version file to obtain the second compressed file.

In this embodiment, the server may generate the incremental upgrade package in advance before receiving the request sent by the terminal for downloading the incremental upgrade package, specifically, after the search request sent by the terminal is received, or after the server obtains the new version file.

Figure 4:
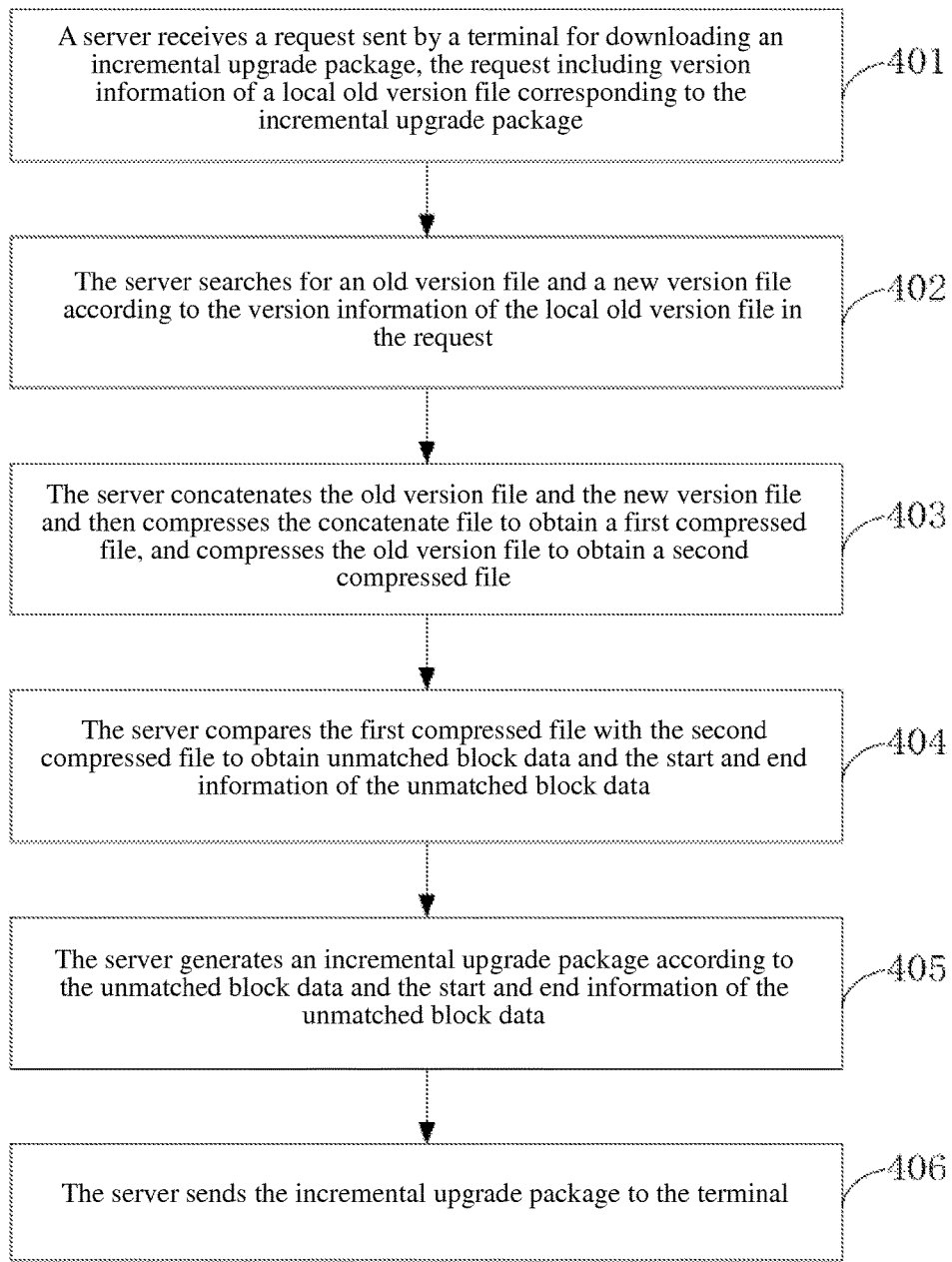
FIG. 4 is a flow chart of an incremental upgrade method according to yet another embodiment of the present invention.

In another embodiment, the server may generate the incremental upgrade package after receiving the request for downloading the incremental upgrade package, and specifically, as shown in FIG. 4, the method may include:

Step 401: The server receives the request sent by the terminal for downloading the incremental upgrade package, the request including version information of the old version file corresponding to the incremental upgrade package.

No matter whether the server has the incremental upgrade package, the terminal can send, at a fixed time or periodically, the request to the server for downloading the incremental upgrade package, and the request may include the version information of the old version file corresponding to the needed incremental upgrade package, so that the server searches for the corresponding incremental upgrade package according to the information.

Step 402: The server searches for the old version file and the new version file according to the version information of the old version file in the request.

After receiving the request, the server searches for the corresponding new version file according to the version information of the old version file in the request.

Step 403: The server concatenates the old version file and the new version file and then compresses the concatenate file to obtain a first compressed file, and compresses the old version file to obtain a second compressed file.

Step 404: The server compares the first compressed file with the second compressed file to obtain unmatched block data and the start and end information of the unmatched block data.

Step 405: The server generates an incremental upgrade package according to the unmatched block data and the start and end information of the unmatched block data.

In the steps 403 to 405, the process of the server generating the incremental upgrade package is the same as that in the foregoing embodiment.

Step 406: The server sends the incremental upgrade package to the terminal.

The terminal concatenates the unmatched block data and the local second compressed file according to the start and end information of the unmatched block data in the incremental upgrade package, to generate a concatenate compressed file, and decompresses the concatenate compressed file to obtain the new version file, and upgrades according to the new version file.

In the embodiment shown in FIG. 4, the server generates an incremental upgrade package according to the unmatched block data information between the compressed file that concatenates the old version file and the new version file and the compressed file of the old version file, so that the terminal obtains the new version file according to the incremental upgrade package, thereby implementing incremental upgrade. The incremental upgrade package has a greatly reduced data size compared with the complete new version file data, and therefore, the size of data that needs to be downloaded by the terminal from the server is obviously less than the conventional method. The method reduces data traffic, reduces occupied bandwidth resources, greatly accelerates the version upgrade, improves the efficiency of version upgrade, and saves storage medium resources of the server.

In the descriptions of the embodiments, a 7zip method is utilized for compression of both the new version file and the old version file, and definitely, the compression algorithm is not limited to the 7zip, and may also include all other algorithms having the same characteristics. The above descriptions are made on the method embodiments of the present invention, and apparatuses implementing the above methods are described with reference to FIG. 5 to FIG. 7.

Figure 5:
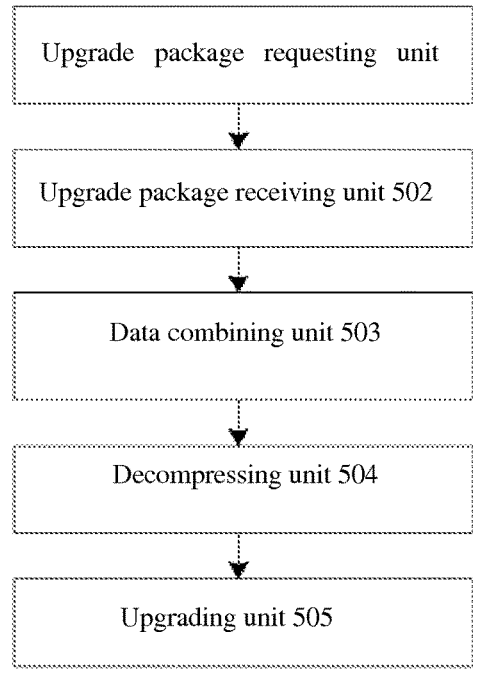
FIG. 5 is a schematic structural view of a terminal applying an incremental upgrade method according to an embodiment of the present invention.

FIG. 5 shows a structure of a terminal applying an incremental upgrade method according to an embodiment of the present invention. As shown in FIG. 5, a terminal according to the embodiment of the present invention may include:

an upgrade package requesting unit 501, configured to send a request to a server for downloading an incremental upgrade package corresponding to a local old version file on the terminal;

an upgrade package receiving unit 502, configured to receive an incremental upgrade package from the server according to the request, where the incremental upgrade package includes unmatched block data obtained by comparing a first compressed file with a second compressed file and the start and end information of the unmatched block data, where the second compressed file is a compressed file of the old version file, and the first compressed file is a compressed file that concatenates the old version file and a new version file;

a data combining unit 503, configured to concatenate the unmatched block data and the local second compressed file according to the start and end information of the unmatched block data in the incremental upgrade package, to generate a concatenate compressed file; and a decompressing unit 504, configured to decompress the concatenate compressed file to obtain the new version file.

After the upgrade package requesting unit 501 of the terminal sends the request to the server for downloading the incremental upgrade package, the upgrade package receiving unit 502 receives the incremental upgrade package including the unmatched block data and the start and end information thereof, and the data combining unit 503 concatenates the unmatched block data and the compressed local old version file according to the start and end information of the unmatched block data in the incremental upgrade package, and then the decompressing unit 504 decompresses the concatenate file to obtain the new version file and the old version file.

In addition, the terminal may further include an upgrading unit 505, configured to upgrade according to the new version file.

In another specific implementation of the present invention, the terminal may further include:

a search requesting unit, configured to send a search request to the server before the upgrade package requesting unit sends the request to the server for downloading the incremental upgrade package, the search request including version information of the old version file; and an information receiving unit, configured to receive feedback information of the server, the feedback information including description information of the incremental upgrade package.

The upgrade package requesting unit is specifically configured to send, according to the description information of the incremental upgrade package in the feedback information, the request to the server for downloading the incremental upgrade package.

In this embodiment, the terminal first sends search request, by using the search requesting unit, to the server to see whether there is an incremental upgrade package, and if yes, according to the relevant information of the incremental upgrade package received by the information receiving unit, the upgrade package requesting unit requests for acquiring the incremental upgrade package.

Figure 6:
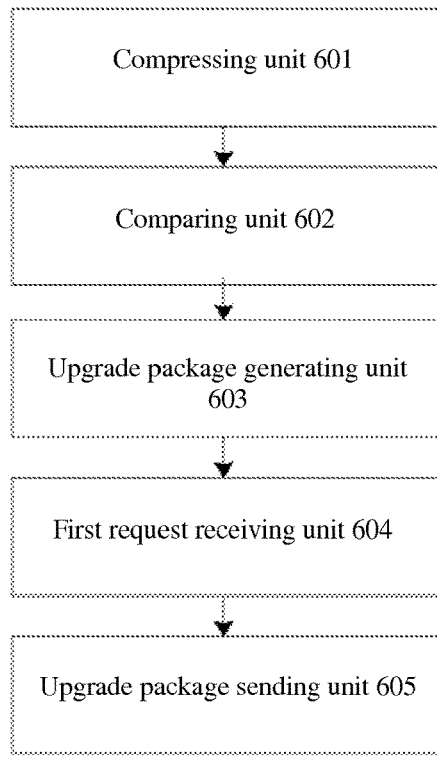
FIG. 6 is a schematic structural view of a server applying an incremental upgrade method according to an embodiment of the present invention.

FIG. 6 shows a structure of a server applying an incremental upgrade method according to an embodiment of the present invention. As shown in FIG. 6, the server applying the incremental upgrade method provided in the present invention includes:

a compressing unit 601, configured to concatenate an old version file and a new version file and then compress the concatenate file to obtain a first compressed file, and compress the old version file to obtain a second compressed file;

a comparing unit 602, configured to compare the first compressed file with the second compressed file to obtain unmatched block data and the start and end information of the unmatched block data;

an upgrade package generating unit 603, configured to generate an incremental upgrade package according to the unmatched block data and the start and end information of the unmatched block data;

a first request receiving unit 604, configured to receive a request sent by a terminal for downloading the incremental upgrade package; and an upgrade package sending unit 605, configured to send the incremental upgrade package to the terminal, such that the terminal can concatenate the unmatched block data and the local second compressed file according to the start and end information of the unmatched block data in the incremental upgrade package, to generate a concatenate compressed file, decompress the concatenate compressed file to obtain the new version file, and upgrade according to the new version file.

The server generates the incremental upgrade package by using the compressing unit 601, the comparing unit 602 and the upgrade package generating unit 603, the incremental upgrade package including the unmatched block data and the start and end information of the unmatched block data, and after the first request receiving unit 604 receives the request for downloading the incremental upgrade package, the upgrade package sending unit 605 sends the incremental upgrade package to the terminal, such that the terminal can perform incremental upgrade.

In another embodiment of the present invention, the server may further include:

a second request receiving unit, configured to receive a search request sent by the terminal before the compressing unit obtains the first compressed file and the second compressed file, the search request including version information of the old version file; and a searching unit, configured to search for the old version file and the new version file according to the version information of the old version file in the search request;

wherein the compressing unit is configured to concatenate the old version file and the new version file found locally and then compress the concatenate file to obtain the first compressed file, and compress the old version file to obtain the second compressed file.

In this embodiment, after the second request receiving unit receives the search request and the searching unit founds the old version file and the new version file, the server may generate the incremental upgrade package by using the compressing unit 601, the comparing unit 602 and the upgrade package generating unit 603.

Figure 7:
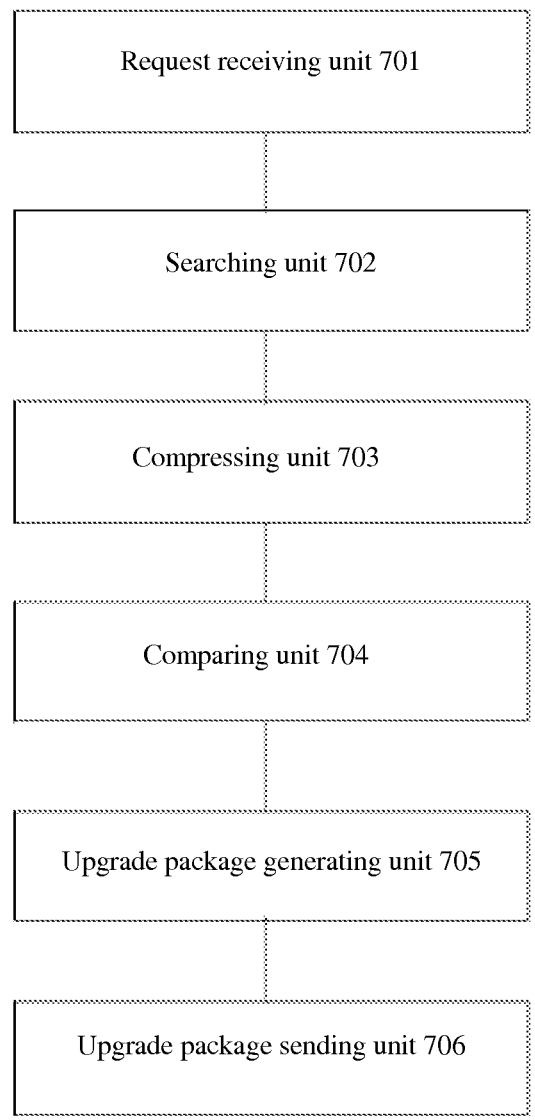
FIG. 7 is a schematic structural view of a server applying an incremental upgrade method according to another embodiment of the present invention.

FIG. 7 shows a structure of a server applying an incremental upgrade method according to another embodiment of the present invention. As shown in FIG. 7, a server according to the embodiment of the present invention includes:

a request receiving unit 701, configured to receive a search request sent by a terminal for downloading an incremental upgrade package, the search request including version information of the old version file corresponding to the incremental upgrade package;

a searching unit 702, configured to searching for an old version file and a new version file according to the version information of the old version file in the request;

a compressing unit 703, configured to concatenate the old version file and the new version file and then compress the concatenate file to obtain a first compressed file, and compress the old version file to obtain a second compressed file;

a comparing unit 704, configured to compare the first compressed file and the second compressed file to obtain unmatched block data and the start and end information of the unmatched block data;

an upgrade package generating unit 705, configured to generate the incremental upgrade package according to the unmatched block data and the start and end information of the unmatched block data; and an upgrade package sending unit 706, configured to send the incremental upgrade package to the terminal, such that the terminal can concatenate the unmatched block data and the local second compressed file to generate a concatenate compressed file according to the start and end information of the unmatched block data in the incremental upgrade package, decompress the concatenate compressed file to obtain the new version file, and upgrade according to the new version file.

In this embodiment, after the request receiving unit 701 receives the request sent by the terminal for downloading the incremental upgrade package and the searching unit 702 finds the old version file and the new version file, the server may generate the incremental upgrade package by using the compressing unit 703, the comparing unit 704 and the upgrade package generating unit 705, and finally, the upgrade package sending unit 706 sends the incremental upgrade package to the terminal, such that the terminal can perform upgrade.

In the embodiment of the present invention, the server generates, through the abovementioned units, an incremental upgrade package according to the unmatched block data information between the compressed file that concatenates the old version file and the new version file and the compressed file of the old version file, so that the terminal obtains the new version file according to the incremental upgrade package, thereby implementing incremental upgrade. The incremental upgrade package has a greatly reduced data size compared with the complete new version file data, and therefore, the size of data that needs to be downloaded by the terminal from the server is obviously less than the conventional method. The method reduces data traffic, reduces occupied bandwidth resources, greatly accelerates the version upgrade, improves the efficiency of version upgrade, and saves storage medium resources of the server.

In the descriptions of the embodiments, a 7zip method is utilized by the compressing unit for compression of both the new version file and the old version file. The compression algorithm is merely an exemplary description. A person skilled in the art should understand that the compression algorithm that can be used in the incremental upgrade method and apparatus provided in the present invention is not limited to the 7zip, and may also include all other algorithms having the same characteristics.

A person of ordinary skill in the art may be aware that, in combination with the examples described in the embodiments disclosed in this specification, units and algorithm steps may be implemented in electronic hardware or a combination of computer software and electronic hardware. Whether the functions are performed in hardware or software depends on particular applications and design constraint conditions of the technical solutions. A person skilled in the art may use different methods to implement the described functions for each particular application, and it should not be considered that the implementation goes beyond the scope of the present invention.

It may be clearly understood by a person skilled in the art that, for the purpose of convenient and brief description, the detailed operating process of the foregoing system, apparatus, and unit may refer to the corresponding process in the foregoing method embodiments, and details are not elaborated herein.

In the several embodiments provided in the present application, it should be understood that the disclosed system, apparatus, and method may be implemented in other manners. For example, the described apparatus embodiment is merely exemplary, such as the division of the units which is merely a logical function division and may be other division in actual implementation, for example, a plurality of units or components may be combined or integrated into another system, or some features may be omit or not performed. In addition, the displayed or discussed mutual couplings or direct couplings or communication connections may be indirect couplings or communication connections through some interfaces, apparatuses or units, and may be in electrical, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in one computer-readable storage medium. Based on such an understanding, the technical solutions of the present invention essentially, or the part contributing to the prior art, or a part of the technical solutions may be implemented in a form of a software product. The software product may be stored in a storage medium, and includes several instructions for instructing a computer device (which may be a personal computer, a server, or a network device) or processor to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The incremental upgrade method, the apparatus applying the method and the storage medium according to the present invention described above with reference to the accompanying drawings are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A method for incremental-upgrading a local old file on a terminal, performed by a processor, comprising:
   sending a request to a server for downloading an incremental upgrade package corresponding to the local old version file on the terminal;
   downloading the incremental upgrade package from the server according to the request for downloading the incremental upgrade package corresponding to the local old version file, wherein the incremental upgrade package comprises unmatched block data obtained by comparing a first compressed file with a second compressed file, and the start and end information of the unmatched block data, wherein the second compressed file is a compressed file of an old version file on the server, and the first compressed file is a compressed file that concatenates the old version file and a new version file on the server, and wherein the old version file and the new version file correspond to the local old version file on the terminal;
   concatenating the unmatched block data and a local second compressed file generated from the local old version file on the terminal according to the start and end information of the unmatched block data in the incremental upgrade package, to generate a concatenate compressed file; and
   decompressing the concatenate compressed file to obtain the new version file and storing the new version file on the terminal.

2. The method according to claim 1, wherein the first compressed file and the second compressed file are both compressed files obtained by using a 7-ZIP compression algorithm.

3. The method according to claim 2, wherein the local second compressed file is a compressed file of the local old version the on the terminal obtain by using a 7-ZIP compression algorithm.

4. The method according to claim 1, wherein sending the request to the server for downloading the incremental upgrade package corresponding to the local old version file on the terminal, comprises:
   sending a search request to the server, the search request comprising version information of the local old version file;
   receiving feedback information from the server, the feedback information comprising description information of the incremental upgrade package; and
   sending, according to the description information of the incremental upgrade package in the feedback information, the request to the server for downloading the incremental upgrade package corresponding to the local old version the on the terminal.

5. The method according to claim 1, wherein the request includes version information of the local old version file on the terminal.

6. A terminal, comprising at least one processor configured to provide:
   an upgrade package requesting unit, configured to send a request to a server for downloading an incremental upgrade package corresponding to a local old version file on the terminal;
   an upgrade package receiving unit, configured to receive the incremental upgrade package from the server according to the request for downloading the incremental upgrade package corresponding to the local old version file, wherein the incremental upgrade package comprises unmatched block data obtained by comparing a first compressed file with a second compressed file, and the start and end information of the unmatched block data, wherein the second compressed the is a compressed file of an old version file on the server, and the first compressed file is a compressed file that concatenates the old version file and a new version file on the server, and wherein the old version file and the new version file correspond to the local old version file on the terminal;

a data combining unit, configured to concatenate the unmatched block data and a local second compressed file generated from the local old version the on the terminal according to the start and end information of the unmatched block data in the incremental upgrade package, to generate a concatenate compressed file; and a decompressing unit, configured to decompress the concatenate compressed file to obtain the new version file and store the new version file on the terminal.

7. The terminal according to claim 6, wherein the at least one processor is further configured to provide:

a search requesting unit, configured to send a search request to the server before the upgrade package requesting unit sends the request to the server for downloading the incremental upgrade package corresponding to the local old version file on the terminal, the search request comprising version information of the local old version file;

an information receiving unit, configured to receive feedback information of the server, the feedback information comprising description information of the incremental upgrade package; and the upgrade package requesting unit, configured to send, according to the description information of the incremental upgrade package in the feedback information, the request to the server for downloading the incremental upgrade package corresponding to the local old version file on the terminal.

\* \* \* \* \*

UNITED STATES PATENT AND TRADEMARK OFFICE
CERTIFICATE OF CORRECTION

| | | |
|---|---|---|
| PATENT NO. | : 10,031,744 B2 | Page 1 of 1 |
| APPLICATION NO. | : 14/653704 | |
| DATED | : July 24, 2018 | |
| INVENTOR(S) | : Jie Liang et al. | |

It is certified that error appears in the above-identified patent and that said Letters Patent is hereby corrected as shown below:

In the Claims

In Claim 3, Column 16, Line 30, please replace:
"version the on the terminal obtain"
With:
--version file on the terminal obtained--.

In Claim 4, Column 16, Line 46, please replace:
"local old version the on the terminal."
With:
--local old version file on the terminal.--.

In Claim 6, Column 16, Line 64, please replace:
"block data, wherein the second compressed the is a"
With:
--block data, wherein the second compressed file is a--.

In Claim 6, Column 17, Line 6, please replace:
"file generated from the local old version the on the"
With:
--file generated from the local old version file on the--.

Signed and Sealed this
Eleventh Day of September, 2018

Andrei Iancu
*Director of the United States Patent and Trademark Office*